United States Patent
Liu et al.

(10) Patent No.: US 9,158,323 B2
(45) Date of Patent: Oct. 13, 2015

(54) POWER CONTROL CIRCUIT AND POWER SUPPLY SYSTEM EMPLOYING THE SAME

(71) Applicant: DELTA ELECTRONICS, INC., Taoyuan Hsien (TW)

(72) Inventors: Yen-Ming Liu, Taoyuan Hsien (TW); Cheng-Chang Huang, Taoyuan Hsien (TW); Hui-Hsin Lin, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 214 days.

(21) Appl. No.: 13/736,160

(22) Filed: Jan. 8, 2013

(65) Prior Publication Data

US 2014/0098580 A1    Apr. 10, 2014

(30) Foreign Application Priority Data

Oct. 9, 2012 (TW) .............................. 101137223 A (51) Int. Cl.
*H02M 3/156* (2006.01)
*G05F 3/02* (2006.01)
*H02M 1/14* (2006.01)
*H02M 3/335* (2006.01)

(52) U.S. Cl.
CPC . *G05F 3/02* (2013.01); *H02M 1/14* (2013.01); *H02M 3/33507* (2013.01); *H02M 3/156* (2013.01)
USPC .......................................... 323/285; 363/45

(58) Field of Classification Search
CPC ........ G05F 3/02; H02M 1/14; H02M 3/33507
USPC ..................... 363/45; 323/282–285
See application file for complete search history.

(56) References Cited

U.S. PATENT DOCUMENTS

| | | | |
|---|---|---|---|
| 6,522,089 B1 * | 2/2003 | Duong et al. ................. | 315/308 |
| 6,527,519 B2 * | 3/2003 | Hwang et al. ............... | 417/44.11 |
| 6,623,246 B2 * | 9/2003 | Hwang et al. ................ | 417/44.1 |
| 8,008,974 B2 | 8/2011 | Ha et al. | |
| 8,294,434 B2 * | 10/2012 | Nishida ......................... | 323/224 |
| 2007/0194724 A1 | 8/2007 | Ishii et al. | |
| 2011/0175578 A1 * | 7/2011 | Pagano ......................... | 320/164 |

(Continued)

FOREIGN PATENT DOCUMENTS

| CN | 101841233 | 9/2010 |
|---|---|---|
| CN | 101309529 | 11/2010 |
| CN | 10124140 | 2/2012 |

(Continued)

*Primary Examiner* — Jessica Han
(74) *Attorney, Agent, or Firm* — Kirton McConkie; Evan R. Witt (57) ABSTRACT

A power control circuit for a power supply system including a control unit, a driving circuit and a power supply unit is disclosed. The power control circuit includes a current detection unit, a voltage detection unit and a power detection unit. The current detection unit is used for detecting a current signal. The voltage detection unit is used for detecting a voltage signal. The power detection unit is connected with the current detection unit, the voltage detection unit and the control unit for acquiring a power signal according to the current signal and voltage signal. By comparing an adjustable power reference signal with the power signal, the control unit issues a control signal to the driving circuit. In response to the control signal, the power supply unit is driven by the driving circuit to output an adjusted power to the load according to the adjustable power reference signal.

13 Claims, 8 Drawing Sheets

(56) References Cited

U.S. PATENT DOCUMENTS

2011/0175584 A1* 7/2011 Huber et al. ............... 323/282
2013/0018607 A1* 1/2013 Jin et al. ...................... 702/60

FOREIGN PATENT DOCUMENTS

| TW | 200839250 | 10/2008 |
|----|-----------|---------|
| TW | 200921663 | 5/2009  |

* cited by examiner

POWER CONTROL CIRCUIT AND POWER SUPPLY SYSTEM EMPLOYING THE SAME

FIELD OF THE INVENTION

The present invention relates to a control circuit, and more particularly to a power control circuit and a power supply system employing the same.

BACKGROUND OF THE INVENTION

In various household appliances, lighting devices and industrial products, the application of non-linear loads are very widespread. For example, non-linear loads may be applied to microwave oven magnetrons, induction coils of induction cookers, various gas discharge lamps, induction heating coils, and so on. These products are usually operated in a wide range of input voltages or a wide range of loads. Generally, a constant-voltage control mechanism or a constant-current control mechanism is widely used in a general power supply apparatus. If the constant-voltage control mechanism or the constant-current control mechanism is applied to the products with the non-linear loads, the input power or the output power can not be effectively controlled. For maintaining stable energy output in any operating condition, a constant-power control mechanism is gradually adopted in the products with the non-linear loads.

In a conventional constant-power control mechanism, a voltage signal and a current signal are firstly detected, and these two signals are provided to a micro-controller unit (MCU) or a digital signal processor (DSP) for calculation. Since the power calculation needs multiplication or more complex calculation such as root-mean-square (RMS), the power calculation may consume many computing resources of the micro-controller unit or the digital signal processor. Under this circumstance, some other important scheduled tasks are adversely affected.

For solving the above drawbacks, an external multiplier chip is used to reduce the workload. Although an additional multiplier chip can achieve the purpose of reducing the workload, the additional multiplier chip may increase manufacturing cost.

Therefore, there is a need of providing an improved power control circuit and a power supply system using the same in order to reduce the workload of the micro-controller unit or the digital signal processor and reduce the manufacturing cost.

SUMMARY OF THE INVENTION

The present invention provides a power control circuit and a power supply system using the power control circuit in order to obviate the drawbacks encountered from the prior art. In the conventional constant-power control mechanism, the voltage signal and the current signal are provided to a micro-controller unit (MCU) or a digital signal processor (DSP) for calculation. Under this circumstance, the power calculation may consume many computing resources of the micro-controller unit or the digital signal processor, and some other important scheduled tasks are adversely affected. Although an additional multiplier chip can achieve the purpose of reducing the workload, the additional multiplier chip may increase manufacturing cost. The inventive power control circuit and power supply system can reduce the workload of the micro-controller unit or the digital signal processor and reduce the manufacturing cost.

In accordance with an aspect of the present invention, there is provided a power control circuit for a power supply system. The power supply system provides electric energy to a load. The power supply system includes a control unit, a driving circuit and a power supply unit. An adjustable power reference signal is received by the control unit. The power control circuit includes a current detection unit, a voltage detection unit, and a power detection unit. The current detection unit is used for detecting a current signal. The voltage detection unit is used for detecting a voltage signal. The power detection unit is connected with the current detection unit, the voltage detection unit and the control unit. The power detection unit includes a weighting circuit for acquiring a power signal according to the current signal and the voltage signal. By comparing the adjustable power reference signal with the power signal, the control unit issues a control signal to the driving circuit. In response to the control signal, the power supply unit is driven by the driving circuit, so that the power supply unit outputs an adjusted power to the load according to the adjustable power reference signal.

In accordance with another aspect of the present invention, there is provided a power supply system for receiving an AC input voltage and an adjustable power reference signal and providing electric energy to a load. The power supply system includes a power supply unit, a filter circuit, a rectifier circuit, a power control circuit, a control unit, and a driving circuit. The power supply unit is connected with the load. The filter circuit is used for filtering the high frequency voltage ripple generated by the power supply unit. The rectifier circuit is used for rectifying the AC input voltage into a DC voltage. The power control circuit is connected with the rectifier circuit. The power control circuit includes a current detection unit, a voltage detection unit, and a power detection unit. The current detection unit is connected with the rectifier circuit for detecting an input current signal, which is inputted into a power input terminal of the power supply unit. The voltage detection unit is connected with the rectifier circuit for detecting an input voltage signal, which is inputted into the power input terminal of the power supply unit. The power detection unit is connected with the current detection unit and the voltage detection unit for acquiring a power signal according to the input current signal and the input voltage signal. The control unit is used for receiving the adjustable power reference signal and comparing the adjustable power reference signal with the power signal, thereby generating a control signal. The driving circuit is connected with the control unit and the power supply unit. In response to the control signal, the power supply unit is driven by the driving circuit, so that the power supply unit outputs an adjusted power to the load according to the adjustable power reference signal.

In accordance with a further aspect of the present invention, there is provided a power supply system for receiving an input voltage and an adjustable power reference signal and providing electric energy to a load. The power supply system includes a power supply unit, a filter circuit, a rectifier circuit, a power control circuit, a control unit, and a driving circuit. The power supply unit is connected with the load. The filter circuit is used for filtering the high frequency voltage ripple generated by the power supply unit. The rectifier circuit is used for rectifying the AC input voltage into a DC voltage. The power control circuit is connected with the power supply unit. The power control circuit includes a current detection unit, a voltage detection unit, and a power detection unit. The current detection unit is connected with the power supply unit for detecting an output current signal, which is outputted from a power output terminal of the power supply unit. The voltage detection unit is connected with the power supply unit for detecting an output voltage signal, which is outputted from the power output terminal of the power supply unit. The power detection unit is connected with the current detection unit and the voltage detection unit for acquiring a power signal according to the output current signal and the output voltage signal. The control unit is used for receiving the adjustable power reference signal and comparing the adjustable power reference signal with the power signal, thereby generating a control signal. The driving circuit is connected with the control unit and the power supply unit. In response to the control signal, the power supply unit is driven by the driving circuit, so that the power supply unit outputs an adjusted power to the load according to the adjustable power reference signal.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a power control circuit and a power supply system using the power control circuit. The power control circuit is applied to a power supply system. The power supply system provides electric energy to a load. The power control circuit may be connected to a power input terminal or a power output terminal of the power supply system. The power control circuit is used for detecting the power signal of the input power or the power signal of the output power. By comparing an adjustable power reference signal with the power signal, the power control circuit can adjust the output power according to the comparing result. Consequently, a constant power can be transmitted to the load. The load applied to the power supply system is a non-linear load, but is not limited thereto. Moreover, the adjustable power reference signal may be a power level control signal which is inputted into a control unit of the power supply system according to the requirement of the load. For example, in a case that the load is an induction coil of an induction cooker, a control panel (not shown) of the induction cooker may be equipped with buttons for adjusting the output power.

Hereinafter, the architecture of the power control circuit of the power supply system will be illustrated with reference to FIGS. 1 and 2, wherein the power control circuit is selectively connected to the power input terminal or the power output terminal of the power supply system.

Figure 1A:
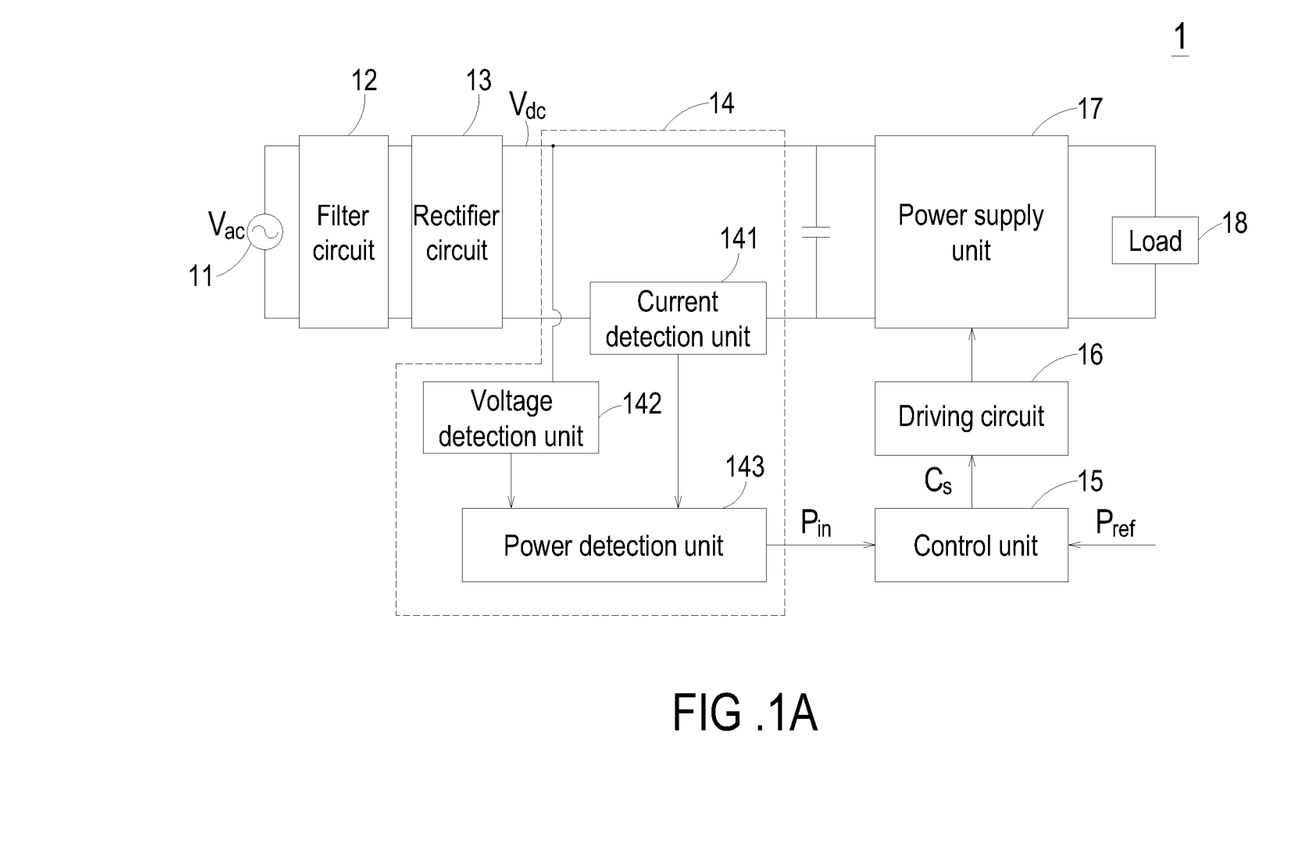
FIG. 1A is a schematic circuit diagram illustrating a power supply system according to an embodiment of the present invention, in which a power control circuit is arranged at a front side of the power supply system.
Figure 2A:
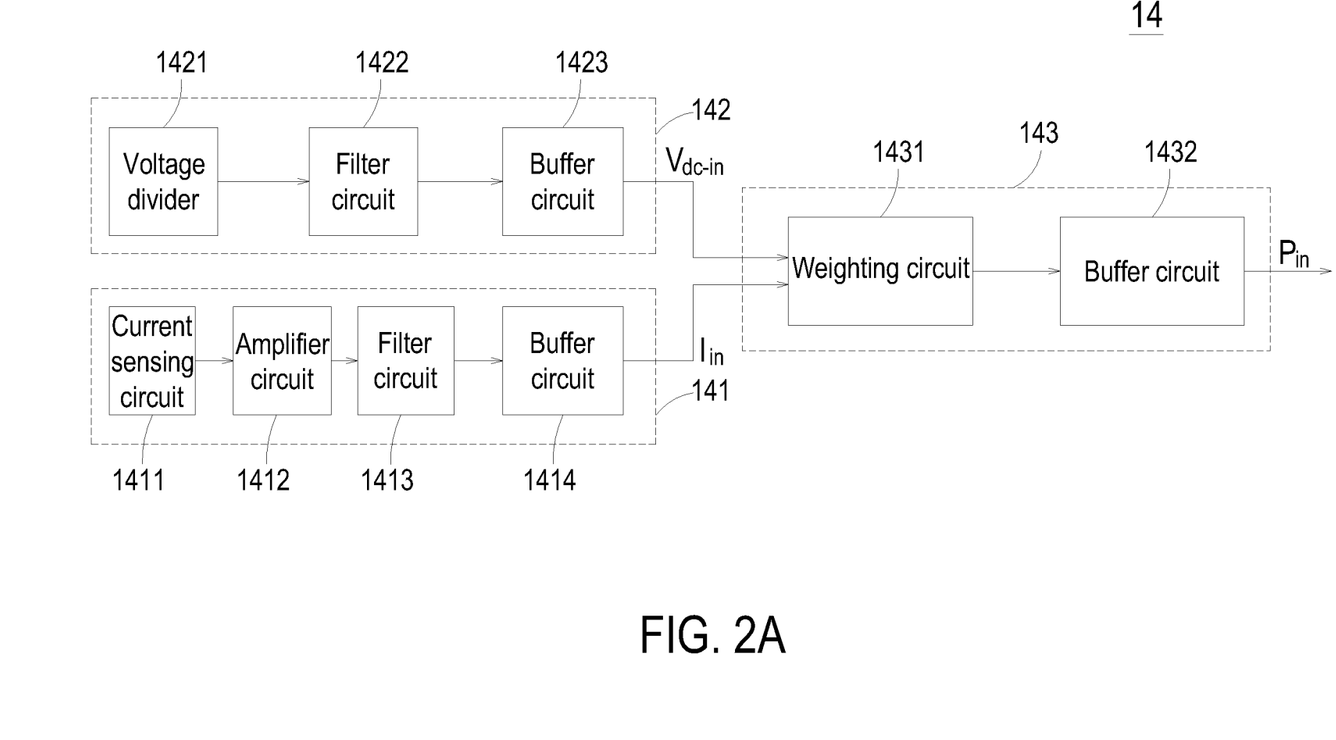
FIG. 2A is a schematic circuit diagram illustrating the power control circuit of FIG. 1B.

FIG. 1A is a schematic circuit diagram illustrating a power supply system according to an embodiment of the present invention, in which a power control circuit is arranged at a front side of the power supply system. As shown in FIG. 1A, the power supply system 1 comprises a filter circuit 12, a rectifier circuit 13, a power control circuit 14, a control unit 15, a driving circuit 16, and a power supply unit 17. The power supply system 1 is used for receiving an AC input voltage Vac from an input power source 11. In addition, according to an adjustable power reference signal $P_{ref}$, the power supply system 1 provides a stable power (e.g. a constant power) to a load 18.

The filter circuit 12 is connected with the input power source 11 and the rectifier circuit 13. The filter circuit 12 is used for receiving the AC input voltage $V_{ac}$ and filtering the high frequency voltage ripple generated by the power supply unit 17. The AC input voltage $V_{ac}$ is transmitted to the rectifier circuit 13. By the rectifier circuit 13, the AC input voltage $V_{ac}$ is converted into a DC link voltage $V_{dc}$. The power control circuit 14 is connected with the rectifier circuit 13, the control unit 15 and the power supply unit 17. The power control circuit 14 comprises a current detection unit 141, a voltage detection unit 142, and a power detection unit 143. The power detection unit 143 is connected with the current detection unit 141 and the voltage detection unit 142. The current detection unit 141 and the voltage detection unit 142 are also connected with the rectifier circuit 13. The current detection unit 141 is used for detecting an input current signal $I_{in}$ (see FIG. 2A), which is inputted into a power input terminal of the power supply unit 17 of the power supply system 1. The voltage detection unit 142 is used for detecting an input voltage signal $V_{dc\_in}$ (see FIG. 2A), which is inputted into the power input terminal of the power supply unit 17 of the power supply system 1. According to the input current signal $I_{in}$ and the input voltage signal $V_{dc\_in}$, the power detection unit 143 acquires a power signal $P_{in}$. The power signal $P_{in}$ indicates the input power level of the input power source 11.

Please refer to FIG. 1A again. The control unit 15 is connected with the driving circuit 16 and the power control circuit 14 for receiving the power signal $P_{in}$ and the adjustable power reference signal $P_{ref}$. By comparing the power signal $P_{in}$ with the adjustable power reference signal $P_{ref}$, the control unit 15 generates a control signal $C_s$. The control signal $C_s$ is transmitted to the driving circuit 16. According to the control signal $C_s$, the driving circuit 16 may adjust the operating frequency or the duty cycle of a switching circuit (not shown) of the power supply unit 17. Consequently, the power supply unit 17 provides a constant power to the load 18 according to adjustable power reference signal $P_{ref}$.

For example, if the power level of the adjustable power reference signal $P_{ref}$ is 1100 W and the power level of the power signal $P_{in}$ is 1000 W, the control unit 15 generates a control signal $C_s$ according to the comparing result between the power signal $P_{in}$ and the adjustable power reference signal $P_{ref}$. Under this circumstance, the control signal $C_s$ indicates that the magnitude of the output power is too low. According to the control signal $C_s$, the driving circuit 16 adjusts the operating frequency or the duty cycle of the switching circuit of the power supply unit 17. Meanwhile, the output power from the power supply unit 17 is increased from 1000 W to 1100 W and maintained at 1100 W. Consequently, the power supply unit 17 provides a constant power (e.g. 1100 W) to the load 18 according to adjustable power reference signal $P_{ref}$.

On the other hand, if the power level of the adjustable power reference signal $P_{ref}$ is 1100 W and the power level of the power signal $P_{in}$ is 1200 W, the control unit 15 generates a control signal $C_s$ according to the comparing result between the power signal $P_{in}$ and the adjustable power reference signal $P_{ref}$. Under this circumstance, the control signal $C_s$ indicates that the magnitude of the output power is too high. According to the control signal $C_s$, the driving circuit 16 adjusts the operating frequency or the duty cycle of the switching circuit of the power supply unit 17. Meanwhile, the output power from the power supply unit 17 is decreased from 1200 W to 1100 W and maintained at 1100 W. Consequently, the power supply unit 17 provides a constant power (e.g. 1100 W) to the load 18 according to adjustable power reference signal $P_{ref}$.

Figure 1B:
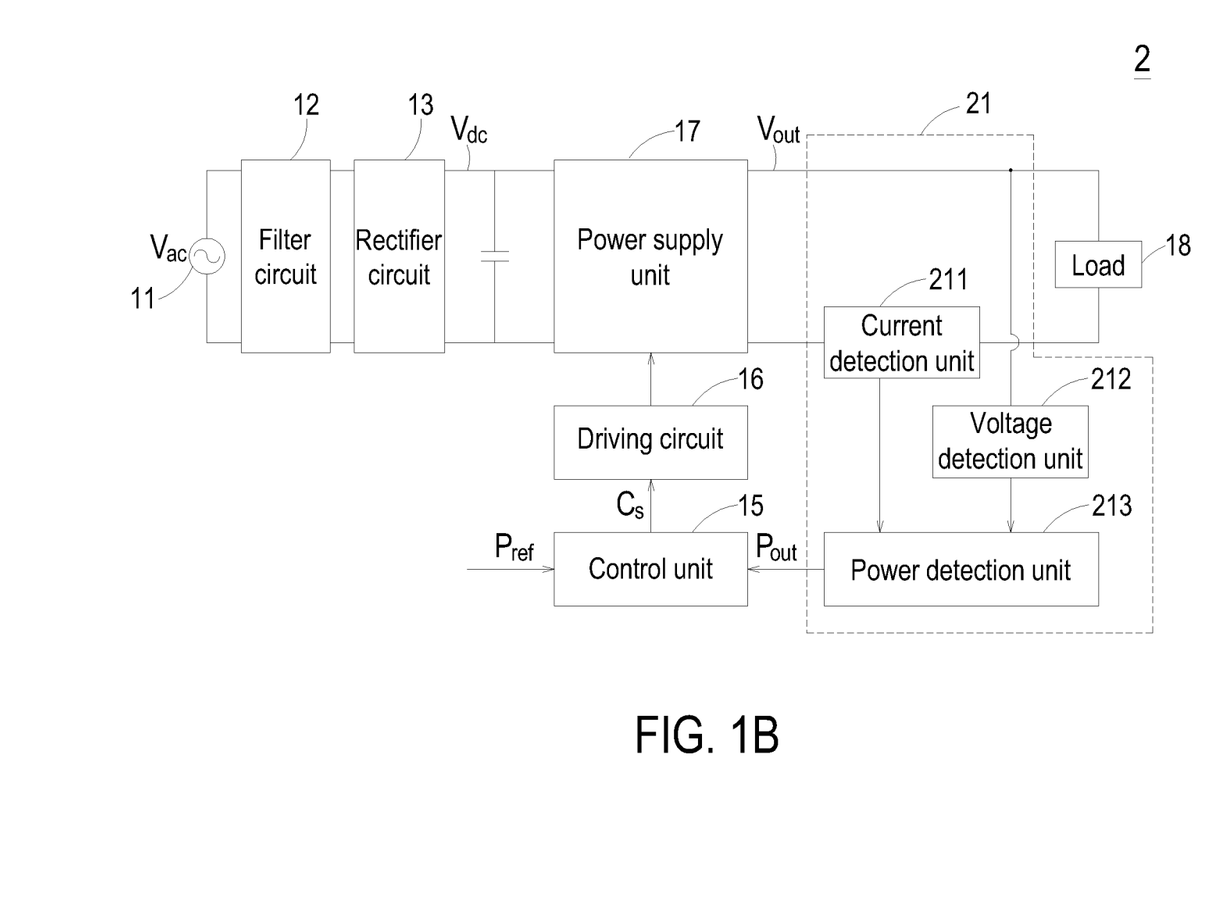
FIG. 1B is a schematic circuit diagram illustrating a power supply system according to another embodiment of the present invention, in which a power control circuit is arranged at a rear side of the power supply system.

FIG. 1B is a schematic circuit diagram illustrating a power supply system according to another embodiment of the present invention, in which a power control circuit is arranged at a rear side of the power supply system. As shown in FIG. 1B, the power supply system 2 comprises a filter circuit 12, a rectifier circuit 13, a power control circuit 21, a control unit 15, a driving circuit 16, and a power supply unit 17. The power supply system 2 is used for receiving an AC input voltage Vac from an input power source 11. In addition, according to an adjustable power reference signal $P_{ref}$, the power supply system 2 provides a stable power (e.g. a constant power) to a load 18. The relationships between the filter circuit 12, the rectifier circuit 13, the control unit 15, the driving circuit 16 and the power supply unit 17 and the functions of these components are similar to those of the power supply system of FIG. 1A, and are not redundantly described herein. In this embodiment, the power control circuit 21 comprises a current detection unit 211, a voltage detection unit 212, and a power detection unit 213. The operating principles of the current detection unit 211, the voltage detection unit 212 and the power detection unit 213 are similar to the operating principles of the current detection unit 141, the voltage detection unit 142 and the power detection unit 143, respectively.

In comparison with the power supply system of FIG. 1A, the power control circuit 21 of this embodiment is arranged at the rear side of the power supply system 2. That is, the power control circuit 21 is connected to a power output terminal of the power supply unit 17 of the power supply system 1. The current detection unit 211 is used for detecting an output current signal of a power output terminal of the power supply unit 17 of the power supply system 1. The voltage detection unit 212 is used for detecting an output voltage signal of the power output terminal of the power supply unit 17 of the power supply system 1. According to the output current signal and the output voltage signal, the power detection unit 213 acquires a power signal $P_{out}$. The power signal $P_{out}$ indicates the output power level of the power supply unit 17.

According to the comparing result between the power signal $P_{out}$ and the adjustable power reference signal $P_{ref}$, the control unit 15 generates a control signal $C_s$. The control signal $C_s$ is transmitted to the driving circuit 16. According to the control signal $C_s$, the driving circuit 16 may adjust the operating frequency or the duty cycle of a switching circuit (not shown) of the power supply unit 17. Consequently, the power supply unit 17 provides a constant power to the load 18 according to adjustable power reference signal $P_{ref}$.

Please refer to FIGS. 1A and 1B again. Since the architecture of the power control circuit of FIG. 1B is substantially identical to the architecture of the power control circuit of FIG. 1A, only the detailed architecture of the power control circuit of FIG. 1A will be illustrated as follows.

FIG. 2A is a schematic circuit diagram illustrating the power control circuit of FIG. 1B. As shown in FIG. 2A, the power control circuit 14 comprises the current detection unit 141, the voltage detection unit 142, and the power detection unit 143. The power detection unit 143 is connected with the current detection unit 141 and the voltage detection unit 142. The voltage detection unit 142 comprises a voltage divider 1421, a filter circuit 1422, and a buffer circuit 1423. The filter circuit 1422 is connected with the voltage divider 1421 and the buffer circuit 1423.

Figure 2B:
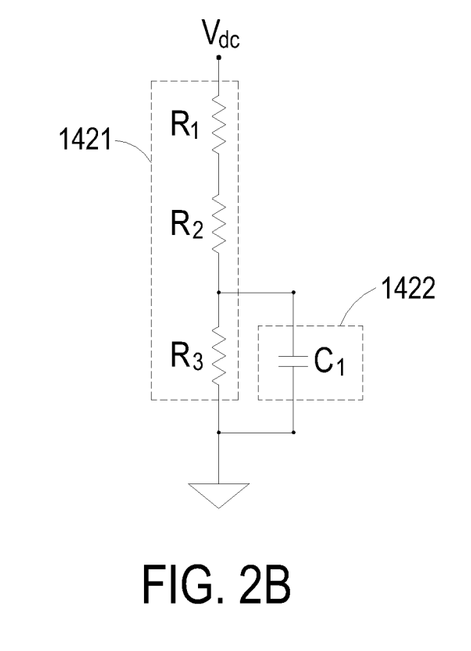
FIG. 2B is a schematic circuit diagram illustrating the voltage divider and the filter circuit of the voltage detection unit of the power control circuit of FIG. 2A.

FIG. 2B is a schematic circuit diagram illustrating the voltage divider and the filter circuit of the voltage detection unit of the power control circuit of FIG. 2A. As shown in FIG. 2B, the voltage divider 1421 comprises three resistors R1, R2 and R3. These resistors R1, R2 and R3 are connected with each other in series. The filter circuit 1422 comprises a capacitor C1. The DC link voltage $V_{dc}$ from the rectifier circuit 13 (see FIG. 1A) are subjected to voltage division by the resistors R1, R2 and R3 of the voltage divider 1421, and then filtered by the capacitor C1. After the divided and filtered, DC link voltage $V_{dc}$ is processed by the buffer circuit 1423, an input voltage signal $V_{dc\_in}$ is outputted from the buffer circuit 1423.

Figure 2C:
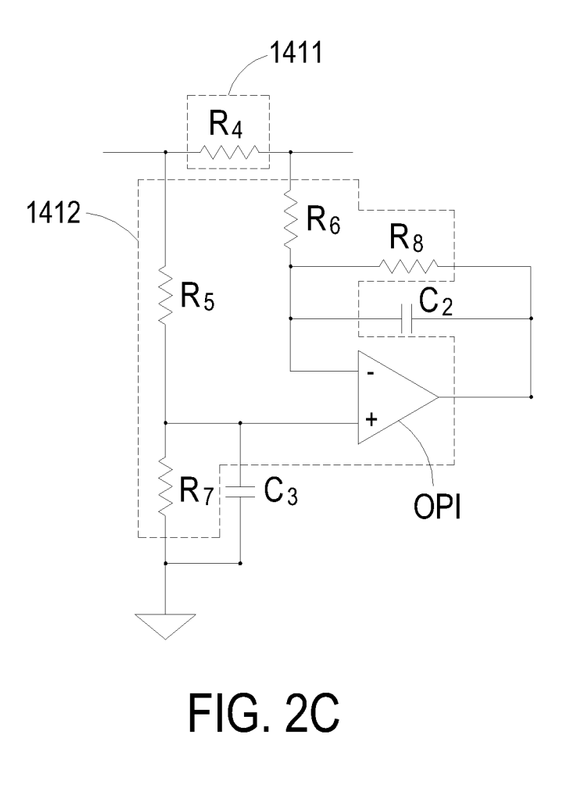
FIG. 2C is a schematic circuit diagram illustrating the current sensing circuit, the amplifier circuit and the filter circuit of the current detection unit of the power control circuit of FIG. 2A.

Please refer to FIG. 2A again. The current detection unit 141 comprises a current sensing circuit 1411, an amplifier circuit 1412, a filter circuit 1413, and a buffer circuit 1414. FIG. 2C is a schematic circuit diagram illustrating the current sensing circuit, the amplifier circuit and the filter circuit of the current detection unit of the power control circuit of FIG. 2A. Please refer to FIGS. 1A, 2A and 2C. The current sensing circuit 1411 is connected with the rectifier circuit 13 and the amplifier circuit 1412. The filter circuit 1413 is connected with the amplifier circuit 1412 and the buffer circuit 1414. The current sensing circuit 1411 comprises a resistor R4. In this embodiment, the amplifier circuit 1412 is a differential amplifier. For example, the amplifier circuit 1412 comprises resistors R5, R6, R7, R8, and an amplifier OP1. The filter circuit 1413 comprises two capacitors C2 and C3. Due to the property of the resistor R4, an input current signal related to the power input terminal of the power supply unit 17 of the power supply system 1 is acquired by the current detection unit 141. The acquired input current signal is amplified by the amplifier circuit 1412 and filtered by the filter circuit 1413. The amplified and filtered input current signal is processed by the buffer circuit 1414, so that an input current signal $I_{in}$ is outputted from the buffer circuit 1414.

Please refer to FIGS. 1A and 2A again. The power detection unit 143 comprises a weighting circuit 1431 and a buffer circuit 1432. The weighting circuit 1431 is connected with the current detection unit 141 and the voltage detection unit 142.

Figure 3:
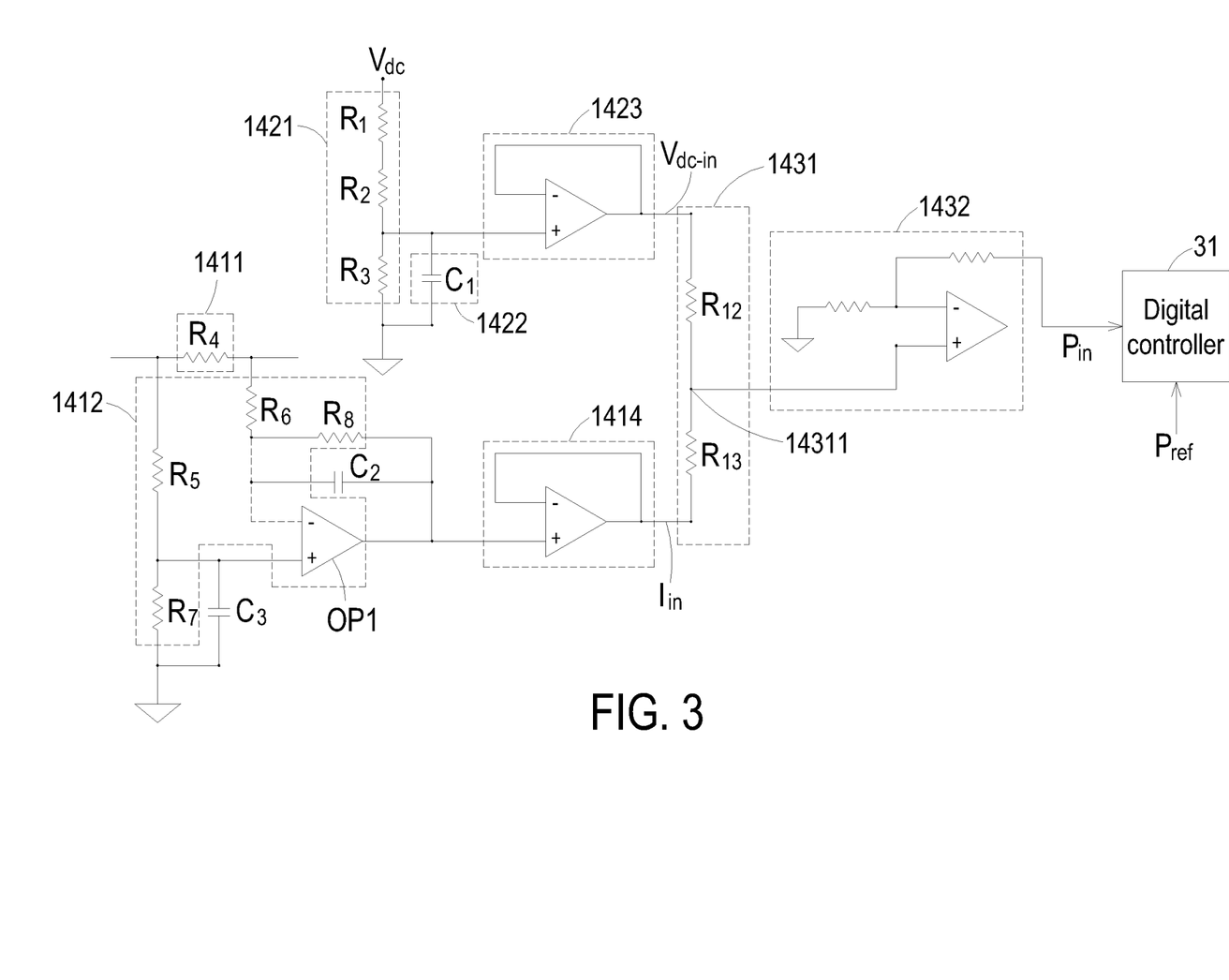
FIG. 3 is a schematic circuit diagram illustrating an exemplary architecture of the power control circuit and the control unit of the power supply system of FIG. 1A.
Figure 4:
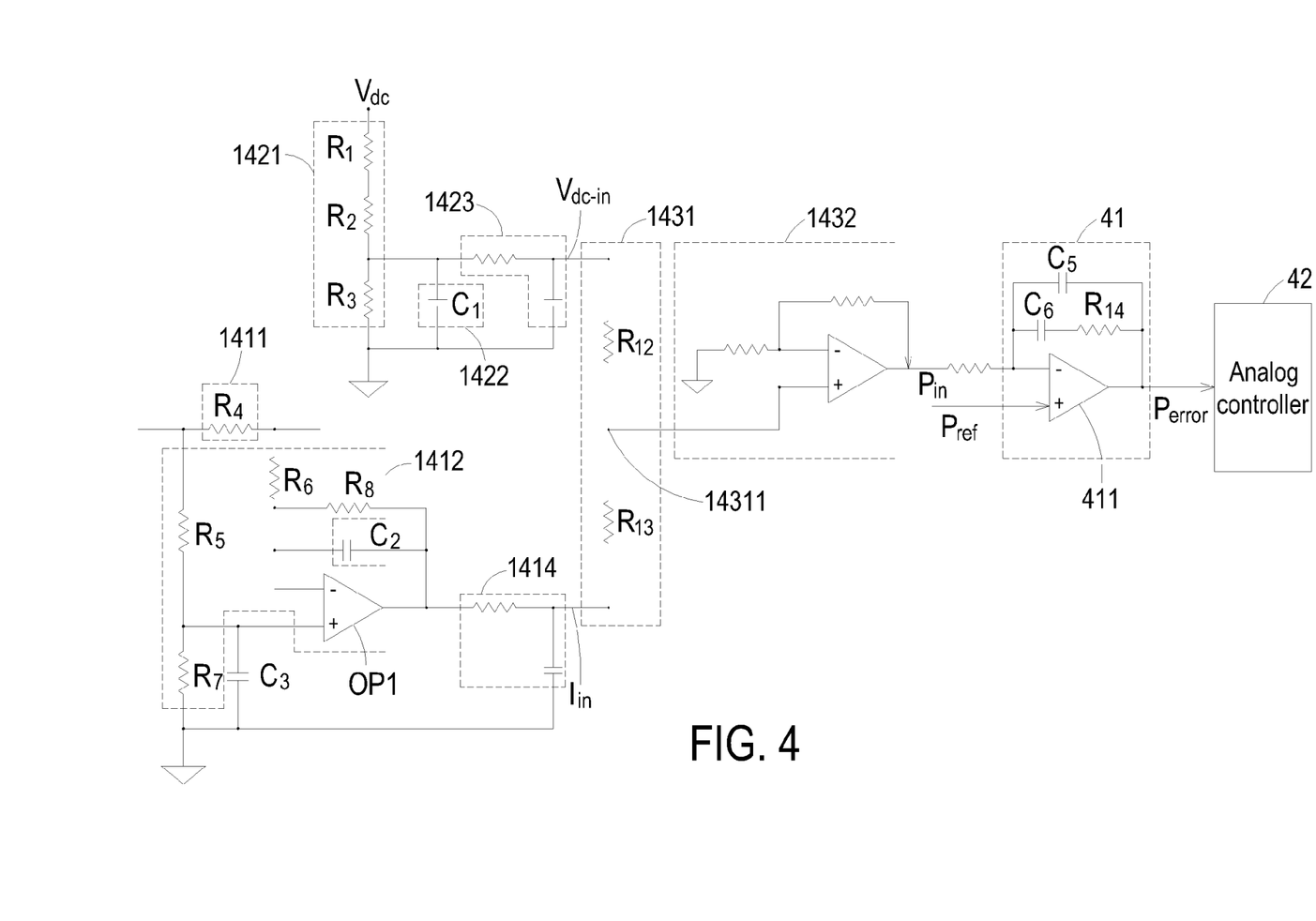
FIG. 4 is a schematic circuit diagram illustrating another exemplary architecture of the power control circuit and the control unit of the power supply system of FIG. 1A.

According to the input current signal $I_{in}$ and the input voltage signal $V_{dc\_in}$, the weighting circuit 1431 acquires a power signal $P_{in}$. Moreover, as shown in FIGS. 3 and 4, the weighting circuit 1431 comprises two resistors R12 and R13, which are connected with each other in series. A first end of the resistor R12 is connected with the buffer circuit 1423 of the voltage detection unit 142 for receiving the input voltage signal $V_{dc\_in}$. A first end of the resistor R13 is connected with the buffer circuit 1414 of the current detection unit 141 for receiving the input current signal $I_{in}$. Moreover, a second end of the resistor R12 and a second end of the resistor R13 are connected to a node 14311. After the input voltage signal $V_{dc\_in}$ and the input current signal $I_{in}$ are weighted by the weighting circuit 1431 and processed by the buffer circuit 1432, the power signal $P_{in}$ is outputted from the buffer circuit 1432.

The buffer circuits 1414, 1423 and 1432 of the power control circuit 14 are used for buffering and protecting the to-be-outputted signals. Under this circumstance, since different signals are not interfered with each other, the possibility of causing signal distortion will be minimized. As shown in FIG. 2A, the buffer circuit 1423 is used for protecting the input voltage signal $V_{dc\_in}$. The buffer circuit 1414 is used for protecting the input current signal $I_{in}$. By the buffer circuit 1423 and the buffer circuit 1414, the input voltage signal $V_{dc\_in}$ and the input current signal $I_{in}$ do not interact each other, so that the possibility of causing signal distortion is minimized. The buffer circuit 1432 is used for protecting the power signal $P_{in}$. By the buffer circuit 1432, the power signal $P_{in}$ and the adjustable power reference signal $P_{ref}$ to be inputted into the control unit 15 are not interfered with each other.

Figure 2D:
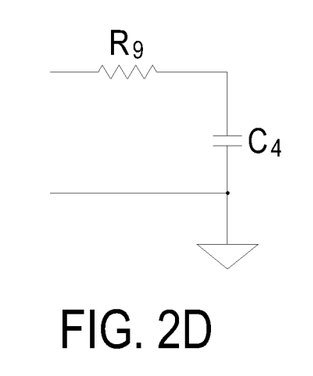
FIG. 2D is a schematic circuit diagram illustrating a first exemplary buffer circuit of the power control circuit of FIG. 2A.
Figure 2E:
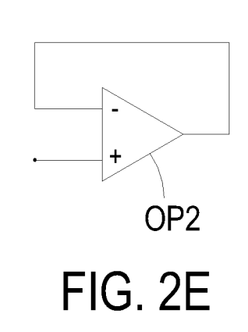
FIG. 2E is a schematic circuit diagram illustrating a second exemplary buffer circuit of the power control circuit of FIG. 2A.
Figure 2F:
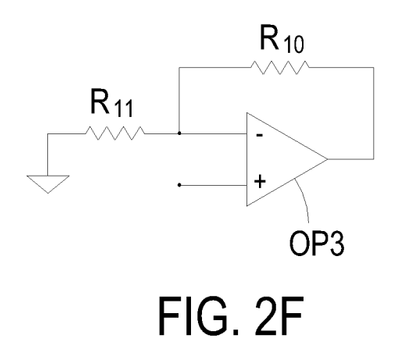
FIG. 2F is a schematic circuit diagram illustrating a third exemplary buffer circuit of the power control circuit of FIG. 2A.

In addition to the functions of buffering and protecting signals, the buffer circuits 1414, 1423 and 1432 are capable of amplifying the to-be-outputted signals according to the practical requirements. Consequently, the architecture of the buffer circuit may be modified according to the practical requirements. FIGS. 2D, 2E and 2F are schematic circuit diagrams illustrating three exemplary buffer circuits to be used in the power control circuit of FIG. 2A. The buffer circuit of FIG. 2D is simply used for buffering and filtering signals. As shown in FIG. 2D, the buffer circuit comprises a resistor R9 and a capacitor C4. The resistor R9 is used for protecting signal, and the capacitor C4 is used for filtering signals. The buffer circuit of FIG. 2E is an amplifier OP2 for protecting the to-be-outputted signals and amplifying the to-be-outputted signals, wherein the amplifier OP2 is a unitary-gain amplifier. The buffer circuit of FIG. 2F comprises resistors R10, R11 and an amplifier OP3 for protecting and amplifying the to-be-outputted signals, wherein the gain value of the amplifier OP3 is determined according to the resistance values of the resistors R10 and R11.

FIG. 3 is a schematic circuit diagram illustrating an exemplary architecture of the power control circuit and the control unit of the power supply system of FIG. 1A. In this embodiment, each of the buffer circuits 1414 and 1423 has the circuit architecture as shown in FIG. 2E, and the buffer circuit 1432 has the circuit architecture as shown in FIG. 2F. In this embodiment, the control unit is a digital controller 31 such as a micro-controller unit (MCU) or a digital signal processor (DSP). The power signal $P_{in}$ from the buffer circuit 1432 and the adjustable power reference signal $P_{ref}$ may be directly utilized to perform power control by the digital controller 31.

FIG. 4 is a schematic circuit diagram illustrating another exemplary architecture of the power control circuit and the control unit of the power supply system of FIG. 1A. In this embodiment, the control unit comprises an analog controller 42. An example of the analog controller 42 includes but is not limited to a pulse frequency modulation (PFM) controller or a pulse width modulation (PWM) controller. Under this circumstance, the control unit further comprises a feedback compensator 41. The feedback compensator 41 comprises two capacitors C5, C6, a resistor R14, and a comparator 411. The feedback compensator 41 is connected with the buffer circuit 1432 of the power detection unit 143 and the analog controller 42. The feedback compensator 41 is used for receiving the adjustable power reference signal $P_{ref}$ and the power signal $P_{in}$. By comparing the adjustable power reference signal $P_{ref}$ with the power signal $P_{in}$, the comparator 411 issues a power error signal $P_{error}$. According to the power error signal $P_{error}$, the analog controller 42 issues the control signal $C_s$ to the driving circuit 16 (see FIG. 1A).

From the above descriptions, the present invention provides a power control circuit and a power supply system using the power control circuit. The power control circuit comprises a current detection unit, a voltage detection unit, and a power detection unit. The current detection unit is used for detecting a current signal. The voltage detection unit is used for detecting a voltage signal. The power detection unit includes a weighting circuit for acquiring a power signal according to the current signal and the voltage signal. By comparing the adjustable power reference signal with the power signal, the control unit issues a control signal to the driving circuit. In response to the control signal, the power supply unit is driven by the driving circuit to output a constant power to the load according to the adjustable power reference signal. Moreover, the power control circuit may be connected to the power input terminal or the power output terminal of the power supply unit of the power supply system in order to control the input power or the output power.

Moreover, the uses of cost-effective components (e.g. resistor, capacitor or amplifier) can achieve the power control function. Since the micro-controller unit or the digital signal processor is not necessary, the manufacturing cost of the power supply system is reduced.

In a case that the power control circuit of the present invention is connected with a digital controller, the power signal can be directly utilized by the digital controller without the need of the complicated multiplication or RMS calculation. Whereas, in a case that the power control circuit is connected with an analog controller, only an additional feedback compensator is needed to generate the power error signal. The way of generating the power error signal is very simple.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power control circuit for a power supply system, said power supply system providing electric energy to a load, said power supply system comprising a control unit, a driving circuit and a power supply unit, an adjustable power reference signal being received by said control unit, said power control circuit comprising:
   a current detection unit for detecting a current signal;
   a voltage detection unit for detecting a voltage signal; and
   a power detection unit connected with said current detection unit, said voltage detection unit and said control unit, and comprising a weighting circuit, wherein said weighting circuit acquires a power signal according to said current signal and said voltage signal, wherein by comparing said adjustable power reference signal with said power signal, said control unit issues a control signal to said driving circuit, wherein in response to said control signal, said power supply unit is driven by said driving circuit, so that said power supply unit outputs an adjusted power to said load according to said adjustable power reference signal;

wherein said weighting circuit comprises a first resistor and a second resistor, which are connected with each other in series, wherein said first resistor is connected with said voltage detection unit for receiving said voltage signal, and said second resistor is connected with said current detection unit for receiving said current signal, so that said weighting circuit acquires said power signal according to said current signal and said voltage signal.

2. The power control circuit according to claim 1, wherein said power control circuit is connected with a power input terminal of said power supply unit, wherein said current signal is an input current signal, said voltage signal is an input voltage signal, and said power signal indicates an input power of said power supply system.

3. The power control circuit according to claim 1, wherein said power control circuit is connected with a power output terminal of said power supply unit, wherein said current signal is an output current signal, said voltage signal is an output voltage signal, and said power signal indicates an output power of said power supply system.

4. The power control circuit according to claim 1, wherein said voltage detection unit comprises a voltage divider, a filter circuit and a buffer circuit, wherein said filter circuit is connected with said voltage divider and said buffer circuit.

5. The power control circuit according to claim 4, wherein said voltage divider comprises plural resistors, which are connected with each other in series.

6. The power control circuit according to claim 1, wherein said current detection unit comprises a current sensing circuit, an amplifier circuit, a filter circuit, and a buffer circuit, wherein said current sensing circuit is connected with said amplifier circuit, and said filter circuit is connected with said amplifier circuit and said buffer circuit.

7. The power control circuit according to claim 6, wherein said current sensing circuit comprises a resistor.

8. The power control circuit according to claim 1, wherein said power detection unit further comprises a buffer circuit, wherein said weighting circuit is connected with said current detection unit, said voltage detection unit and said buffer circuit.

9. The power control circuit according to claim 1, wherein said load is a non-linear load.

10. A power supply system for receiving an AC input voltage and an adjustable power reference signal and providing electric energy to a load, said power supply system comprising:
    a power supply unit connected with said load;
    a filter circuit for filtering high frequency voltage ripple generated by said power supply unit;
    a rectifier circuit for rectifying said AC input voltage into a DC voltage;
    a power control circuit connected with said rectifier circuit, and comprising:
        a current detection unit connected with said rectifier circuit for detecting an input current signal, which is inputted into a power input terminal of said power supply unit;
        a voltage detection unit connected with said rectifier circuit for detecting an input voltage signal, which is inputted into said power input terminal of said power supply unit; and
        a power detection unit connected with said current detection unit and said voltage detection unit, and comprising a weighting circuit, wherein said weighting circuit acquires a power signal according to said input current signal and said input voltage signal;
    a control unit for receiving said adjustable power reference signal and comparing said adjustable power reference signal with said power signal, thereby generating a control signal; and
    a driving circuit connected with said control unit and said power supply unit, wherein in response to said control signal, said power supply unit is driven by said driving circuit, so that said power supply unit outputs an adjusted power to said load according to said adjustable power reference signal;
    wherein said weighting circuit comprises a first resistor and a second resistor, which are connected with each other in series, wherein said first resistor is connected with said voltage detection unit for receiving said input voltage signal, and said second resistor is connected with said current detection unit for receiving said input current signal, so that said weighting circuit acquires said power signal according to said input current signal and said input voltage signal.

11. The power supply system according to claim 10, wherein said control unit is a digital controller.

12. The power supply system according to claim 10, wherein said control unit comprises an analog controller and a feedback compensator, wherein said feedback compensator is connected with said power detection unit and said analog controller for receiving said adjustable power reference signal and said power signal, wherein by comparing said adjustable power reference signal with said power signal, said feedback compensator issues a power error signal, wherein according to said power error signal, said analog controller generates said control signal.

13. A power supply system for receiving an AC input voltage and an adjustable power reference signal and providing electric energy to a load, said power supply system comprising:
    a power supply unit connected with said load;
    a filter circuit for filtering high frequency voltage ripple generated by said power supply unit;
    a rectifier circuit for rectifying said AC input voltage into a DC voltage;
    a power control circuit connected with said power supply unit, and comprising:
        a current detection unit connected with said power supply unit for detecting an output current signal, which is outputted from a power output terminal of said power supply unit;
        a voltage detection unit connected with said power supply unit for detecting an output voltage signal, which is outputted from said power output terminal of said power supply unit; and
        a power detection unit connected with said current detection unit and said voltage detection unit, and comprising a weighting circuit, wherein said weighting circuit acquires a power signal according to said output current signal and said output voltage signal;

a control unit for receiving said adjustable power reference signal and comparing said adjustable power reference signal with said power signal, thereby generating a control signal; and a driving circuit connected with said control unit and said power supply unit, wherein in response to said control signal, said power supply unit is driven by said driving circuit, so that said power supply unit outputs an adjusted power to said load according to said adjustable power reference signal;

wherein said weighting circuit comprises a first resistor and a second resistor, which are connected with each other in series, wherein said first resistor is connected with said voltage detection unit for receiving said output voltage signal, and said second resistor is connected with said current detection unit for receiving said output current signal, so that said weighting circuit acquires said power signal according to said output current signal and said output voltage signal.

* * * * *